United States Patent [19]
Haskins

[11] 3,930,670
[45] Jan. 6, 1976

[54] OSCILLATION DAMPING AND STABILIZING TRAILER HITCH DOLLY

[75] Inventor: Robert William Haskins, Orchard Lake, Mich.

[73] Assignee: Robert Whittemore Haskins, Orchard Lake, Mich.

[22] Filed: Oct. 8, 1974

[21] Appl. No.: 506,980

[52] U.S. Cl. ........................................... 280/476 R
[51] Int. Cl.² ......................................... B60D 7/00
[58] Field of Search...... 280/476 R, 460, 81 R, 496, 280/498

[56] References Cited
UNITED STATES PATENTS

| | | | |
|---|---|---|---|
| 2,302,246 | 11/1942 | Nelson | 280/476 R |
| 2,506,718 | 5/1950 | Grant | 280/476 R |
| 2,570,482 | 10/1951 | Pruitt | 280/476 R |
| 2,622,891 | 12/1952 | Knapp | 280/476 R |

*Primary Examiner*—Robert R. Song
*Attorney, Agent, or Firm*—Willis Bugbee

[57] ABSTRACT

This dolly frame has a cross member upon which a pair of ground wheels are rotatably mounted and from which laterally-spaced opposite side members project forward. These side members terminate in wedge-shaped coupling members pivotally connected to coupling member adapters permanently secured to the rearward portion of the towing vehicle chassis, thereby providing limited rise and fall of the dolly relatively to the adapters. The center of a transverse leaf spring mounted on the cross member engages the lower end of a trailer hitch ball structure mounted on a cross-head which is in turn connected to a shock absorber to thereby dampen the oscillation of the leaf spring and thereby eliminate the pitching otherwise transmitted to the towing car as a jerking motion back and forth when the dolly hits a bad bump.

10 Claims, 8 Drawing Figures

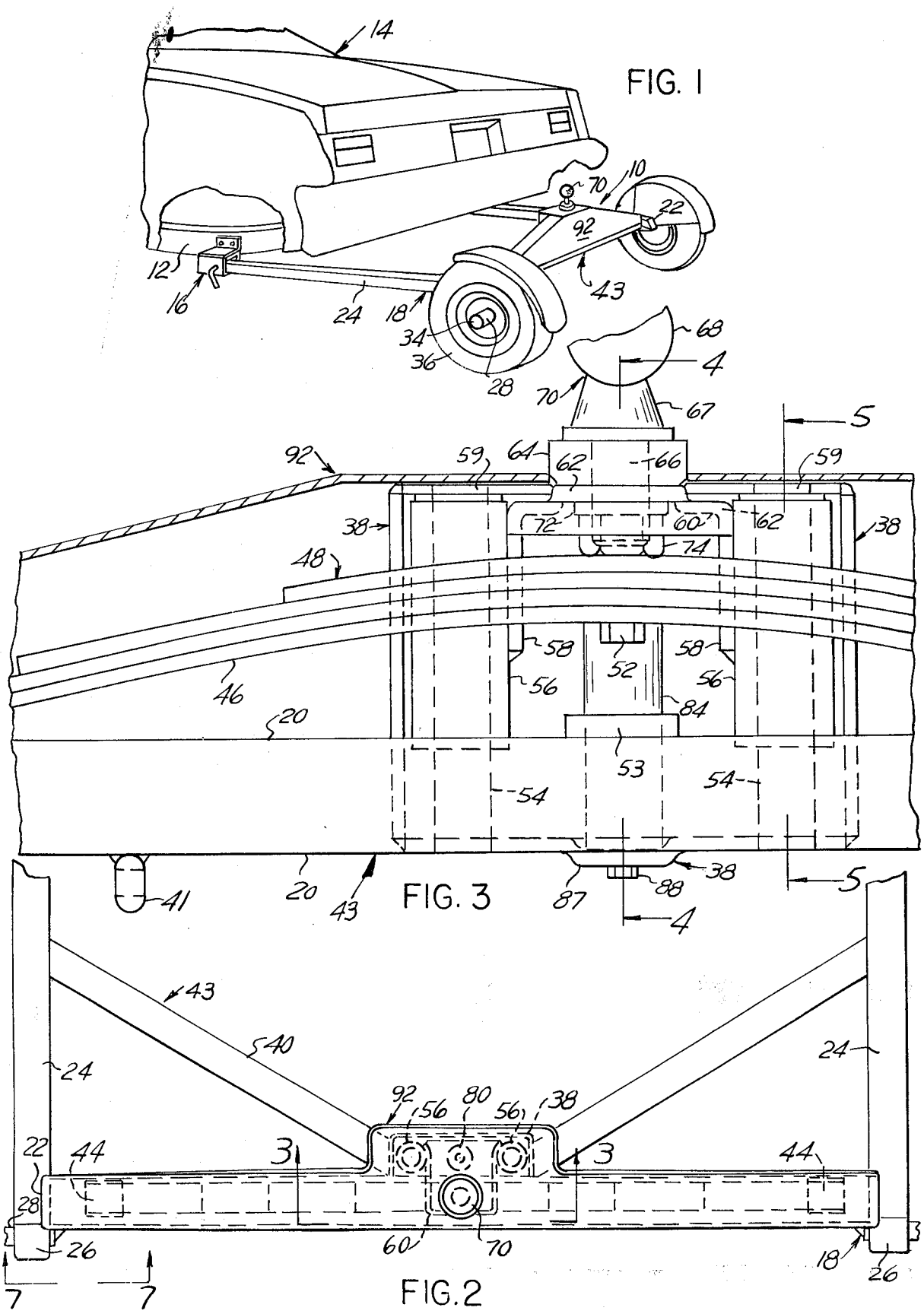

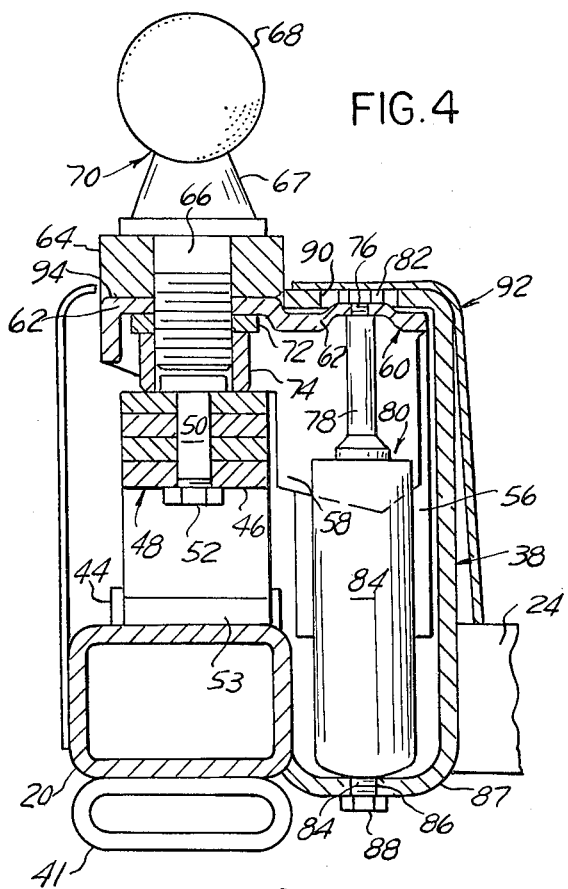
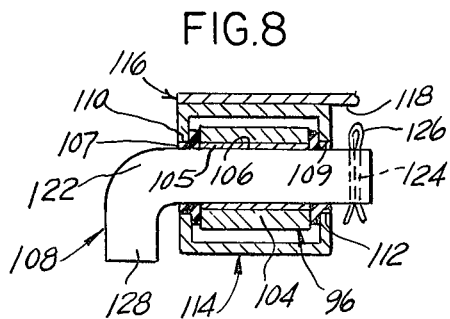
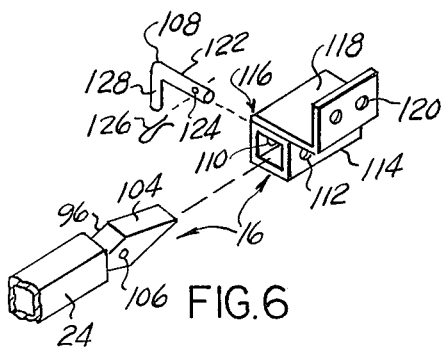
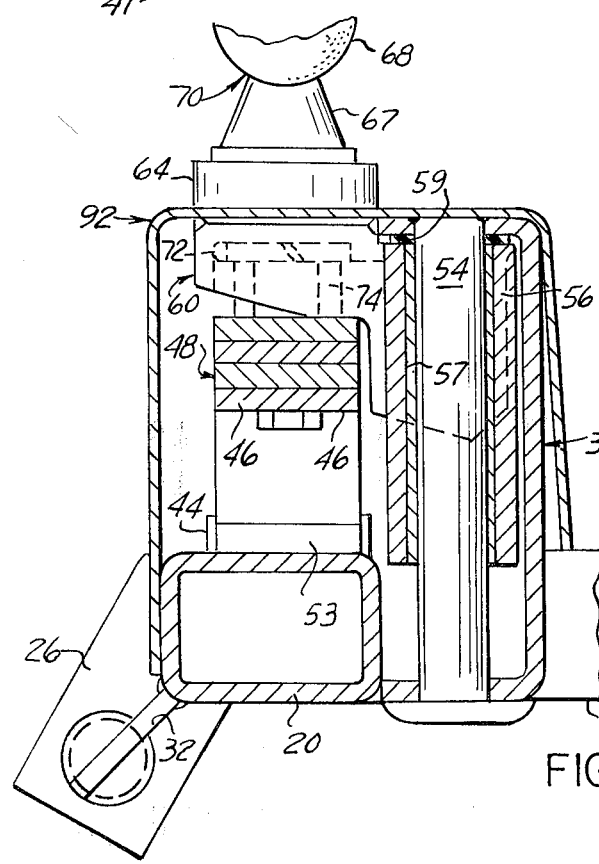
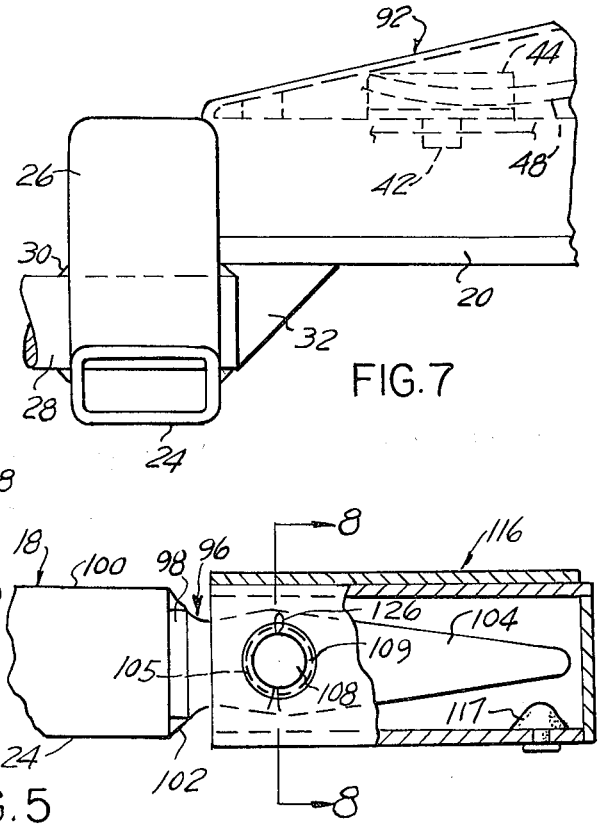

3,930,670

OSCILLATION DAMPING AND STABILIZING TRAILER HITCH DOLLY

SUMMARY OF THE INVENTION

This invention particularly resides in the provision of a trailer hitch ball structure mounted on a cross-head and engaged by a transverse leaf spring with a very low spring rate instead of by a prior-used coil spring necessarily having a high spring rate because of its limited length capable of being accommodated within the available space limits of the dolly. Another improvement is the connection of a shock absorber to the cross-head carrying the trailer hitch ball structure engaged by the leaf spring so as to dampen the oscillations of the leaf spring.

BACKGROUND OF THE INVENTION

The provision of a trailer hitch dolly interposed between the towing vehicle and the towed trailer has hitherto greatly reduced heavy hitch loads on the rear of the vehicle where the trailer was previously coupled directly thereto. Where a coil spring supported the trailer hitch ball on the dolly, as in my U.S. Pat. No. 3,837,677 dated Sept. 24, 1974, a reduction in side sway resulted, but pitching or fore-and-aft rising and falling still occurred when the dolly encountered a bad bump and this motion was transmitted to the towing car in the form of a jerking motion back and forth. The coil spring necessarily possessed a higher spring rate than was desirable, yet it could not be lengthened sufficiently to reduce the spring rate satisfactorily within the space available on the dolly, since such reduction required an excessively long coil spring which would encounter the road surface if made long enough to adequately dampen the oscillation. The present invention provides a leaf spring of great length which has a low spring rate and its oscillations are additionally dampened by a shock absorber connected thereto, and guide rods are provided to guide the oscillations. This construction eliminates the pitching fore-and-aft which occurs when the dolly meets a serious road defect and likewise eliminates the action transmitted thereby to the towing car as a jerking motion back and forth.

IN THE DRAWINGS

FIG. 1 is a perspective view of the oscillation-damping and stabilizing trailer hitch dolly of the present invention, as attached to a towing vehicle, the towed trailer being omitted to enable enlargement of the parts;

FIG. 2 is a top plan view of the rearward portion of the dolly, with the ground wheels omitted to conserve space;

FIG. 3 is an enlarged fragmentary rear elevation, partly in section, taken along the line 3—3 in FIG. 2;

FIG. 4 is a central vertical section, taken along the line 4—4 in FIG. 3;

FIG. 5 is a vertical section taken along the line 5—5 in FIG. 3;

FIG. 6 is an exploded perspective view of the coupling device shown in the lower left-hand corner of FIG. 1;

FIG. 7 is a rear elevation looking in the direction of the line 7—7 in FIG. 2; and FIG. 8 is a vertical cross-section, taken along the line 8—8 in FIG. 5.

Referring to the drawings in detail, FIG. 1 shows an oscillation-damping and stabilizing trailer hitch dolly, generally designated 10, as coupled to the rearward chassis portion 12 of a towing vehicle, generally designated 14, by means of a coupling device, generally designated 16, more fully described below. The dolly 10 is mounted upon a dolly frame, generally designated 18 (FIGS. 1 and 2). The frame 18 includes a cross member 20 (FIG. 3), the opposite ends of which are welded or otherwise secured at 22 to the rearward portions of elongated dolly frame side members 24 constituting a draft structure and having downwardly-turned rear end portions 26 to the lower ends of which are secured outwardly-projecting axles 28 (FIG. 7) as by welding at 30 and braced by gusset plates 32 (FIG. 7). Ground wheels 34 with tires 36 are rotatably mounted on the axles 28 to support the weight of the dolly 10 and the loads impressed upon it in the manner described below. Secured to the forward face of the cross member 20 is a flanged rectangular housing 38. Welded or otherwise secured to and connecting the side members 24 to the side flanges of the housing 38 are oblique braces 40 (FIG. 2). Welded or otherwise secured to the under side of the cross member 20 are attachment rings 41 for the connection of the usual trailer safety chains (not shown). The frame side members 24 and the cross member 20 are preferably formed from rectangular-section steel tubing. The dolly frame 18, axles 28, wheels 34 and tires 36 collectively constitute a dolly chassis, generally designated 43.

The cross member 20 near its outer ends (FIG. 7) is drilled to receive stems 42 projecting downward from two parallel-flanged wear plates 44, preferably of nylon plastic, which are slidably engaged by the outer ends of the lowermost leaf 46 on a leaf spring 48. The center of the leaf spring 48 is drilled vertically to receive a spring-retaining bolt 50 and nut 52 cushioned by a rubber disc 53 mounted on the cross member 20. The upper and lower horizontal portions of the housing 38 are drilled near their opposite ends to receive parallel vertical guide rods or pins 54 (FIGS. 3 and 5) upon which are mounted sleeves 56 containing bushings 57 (FIG. 5). The sleeves 56 are slidable vertically on the guide rods 54 within the bracket 38 and cushioned by rubber washers 59 above their upper ends. The sleeves 56 are welded or otherwise secured to the side arms 58 of a cross head 60 having a flanged top wall 62 to which is secured a short collar 64. Passing through the center of the collar 64 is the threaded shank or stem 66 extending downward from the flanged tapered neck 67 of the ball 68 of a second trailer hitch ball component, generally designated 70. Mounted on the threaded lower end of the shank 66 beneath the flanged flat top 62 of the cross head 60 are a spring lock washer 72 and a ball-retaining nut 74 (FIG. 4) which engages the center of the leaf spring 48 above and around the head of the bolt 50 (FIG. 4).

The cross head 60 is in the form of a heavy sheet metal stamping, the upper wall 62 of which is cupped and drilled near its rearward edge (FIG. 4) to receive the reduced diameter threaded upper end 76 of the piston rod 78 of a conventional fluid-operated shock absorber, generally designated 80, either hydraulic or pneumatic, and held in place by a nut 82 threaded upon the threaded portion 76. The piston rod 78 at its lower end is connected to a piston head (not shown) within the cylinder 84 of the shock absorber 80. The shock absorber 80 may be of one of several types available on the open market and its details are beyond the scope of the present invention. Such shock absorbers are in widespread use upon the suspensions of automobiles. The leaf spring 48 absorbs the energy from bumps, during which the shock absorber 80 permits the chassis of the dolly 10 to rise freely but retards its descent so that the hitch ball 70 is kept at a substantially constant level.

Secured to and extending downward from the cylinder 84 of the shock absorber 80 is a threaded stud 84 which passes downward through a hole 86 in the cupped lower flange 87 of the flanged rectangular housing 38 (FIGS. 3 and 4) where it is held in place by a nut 88. The upper wall of the housing 38 is provided with an opening 90 which provides clearance for the nut 82 on the threaded piston rod portion 76 and the adjacent portion of the flat top 62 of the cross head 60. An elongated hollow pyramidal molded synthetic plastic hood 92 extends downward over the entire mechanism resting upon and including the cross member 20 and has an opening 94 in the top thereof providing clearance for the trailer hitch ball component 70 and the collar 64 beneath its neck 67 (FIG. 4).

The coupling device 16 for each side member 24 of the dolly frame 18 (FIGS. 1 and 6) includes a tapered rocking coupling member 96 (FIGS. 5 and 6) with a rearward portion 98 which is welded at 102 into the forward end portion 100 of each side member 24. The wedge-shaped forward portion 104 of the rocking member 96 is bored transversely at 106 to receive a nylon bushing 105 through which passes an L-shaped tranverse pivot pin 108. The pin 108 passes through flanged nylon bushings 107 and 109 seated in horizontally aligned bores 110 and 112 in the open-ended box-shaped tubular coupling portion 114 of an adapter structure 116, the bottom wall of which is drilled to receive a rubber cushion 117 for the portion 104. Welded to the top wall of the box-shaped portion 114 is an L-shaped attachment bracket 118 (FIG. 6) which is drilled as at 120 to receive bolts or rivets by which it is secured to the side frame member 12 of the towing vehicle 14 (FIG. 1). The L-shaped pivot pin 108 at the end of its horizontal pivot portion 122 is drilled at 124 to receive a cotter pin 126 or other locking element. Extending perpendicularly to the pivot portion 122 is a handle 128 by which the pivot pin 108 can be inserted or removed from its pivot bore 106 in the coupling member 96 by way of the aligned holes 110 and 112 in the adapter structure 116 of the coupling device 16.

In the operation of the oscillation-damping and stabilizing trailer hitch dolly 10 of the present invention, let it be assumed that the wedge-shaped forward portions 104 of the rocking coupling members 96 have been coupled to their respective adapters 116 by aligning their bores 106 with the bores 110 and 112 in the box-shaped tubular coupling portions 114 of their respective adapters 116 and then inserting the pivot pins 108 and securing them by the cotter pins 126 in the holes 124. Let it also be assumed that the conventional hitch socket or first trailer hitch component of the coupling tongue (not shown) of the trailer (also not shown) has been coupled to the hitch ball component 70 of the dolly 10 and that the safety chains (also not shown) of the trailer have been connected to the attachment rings 41. Let it also be assumed that the adapters 116 have been attached at the proper locations to the vehicle frame or chassis side members 12 by bolts or rivets through the holes 120 in the vertical flanges of the attachment brackets 118.

The operator then operates the towing vehicle 14 so as to tow the trailer by the intermediate connection thereto of the dolly 10. As the trailer dolly wheels 34 pass over bumps or depressions in the roadway, the side members 24 rise and fall freely with the wheels 34 and tires 36 by the pivotal connections of the pivot pins 108 passsing through the horizontal bores 106 in the rocking members 96. When the chassis of the dolly 10 rises in passing over a bump, the leaf spring 48 absorbs the energy thereof while the shock absorber 80 permits its piston rod 78 to rise freely along with the cross head 60 connected to the hitch ball component 70. When the chassis of the dolly 10 subsequently descends, however, the shock absorber 80 retards the downward stroke of its piston rod 78 and dampens the descent of the dolly chassis.

When a large truck or tractor-trailer vehicle passes the towing vehicle 14, the consequent vacuum created therebetween tends to cause the trailer and the dolly 10 to slide sideways bodily, but such sliding is greatly retarded or prevented by the friction between the tires 36 of the non-swivelled wheels 34 and the roadway. As a result of this, the dolly 10 minimizes any side sway of the trailer during normal travel by, in effect, locking the rearward end of the towing vehicle to the roadway while at the same time permitting limited rise and fall of the dolly 10 around the pivot pins 108 of the coupling devices 16. The pivot pins 108 of the coupling devices 16 in combination with the wedge-shaped portions 104 in the box-shaped tubular coupling portions 114 of the adapters 116 limit the upward and downward motion of the dolly chassis 43. At the same time, the damping action of the shock absorber 84 permits the chassis 43 of the dolly 10 to move upward freely while the leaf spring 48 absorbs the energy thereof when the dolly wheels 34, 36 pass over a bump but retards its descent. Thus, the oscillation-dampeing and stabilizing trailer hitch dolly 10 of the present invention not only stabilizes the trailer by preventing side sway of the trailer and dolly caused by a cross wind or a passing truck, but also dampens the vertical motion of the dolly 10 upon its encountering bumps and chuck holes in the roadway.

I claim:

1. An oscillation-damping and stabilizing trailer hitch dolly for connecting the chassis of a towing vehicle to a trailer with a conventional first trailer hitch component thereon, said dolly comprising a dolly coupling adapter structure adapted to be secured to the rearward portion of the towing vehicle chassis, a dolly frame including a cross member and a draft structure extending forward from said cross member into coupling engagement with said adapter structure, pivot means pivotally interconnecting said structures, axle means mounted on said frame transversely of said draft structure, ground wheels mounted on said axle means in laterally-spaced relationship for rotation relatively to said frame, a leaf spring mounted on said cross member transversely of said frame for vertical oscillation relatively thereto, and a second trailer hitch component adapted to cooperably engage the first trailer hitch component in separable hitching relationship, said second trailer hitch component operatively engaging and transmitting motion between said leaf spring and the first trailer hitch component.

2. An oscilation-damping and stabilizing trailer hitch dolly, according to claim 1, wherein a vertical guideway is connected to said cross member adjacent said second trailer hitch component in vertical guiding relationship therewith.

3. An oscillation-damping and stabilizing trailer hitch dolly, according to claim 1, wherein a vertically operative shock absorber is mounted on said frame and operatively connected to said leaf spring in oscillation-damping relationship therewith.

4. An oscillation-damping and stabilizing trailer hitch dolly, according to claim 3, wherein said shock absorber is a fluid-operated shock absorber.

5. An oscillation-damping and stabilizing trailer hitch dolly, according to claim 4, wherein said shock absorber has a cylinder element and a piston element reciprocable in said cylinder element, one of said elements being connected to said frame and the other element being operatively connected to said second trailer hitch component whereby to dampen the oscillations imparted thereto by said leaf spring in response to the engagement of said ground wheels with roadway obstacles.

6. An oscillation-damping and stabilizing trailer hitch dolly, according to claim 2, wherein said guideway includies a vertical guide member connected to said cross member in supported relationship therewith.

7. An oscillation-damping and stabilizing trailer hitch dolly, according to claim 3, wherein a cross-head is connected to said second trailer hitch component and is also connected to said shock absorber in motion-transmitting relationship therebetween.

8. An oscillation-damping and stabilizing trailer hitch dolly, according to claim 5, wherein a cross-head is supportingly connected to said second trailer hitch component and is also operatively connected to said other element in motion-transmitting relationship therebetween.

9. An oscillation-damping and stabilizing trailer hitch dolly, according to claim 7, wherein a vertical guide member is connected to said cross-member in supported relationship therewith and wherein said cross-head slidably engages said guide member in guided relationship therewith.

10. An oscillation-damping and stabilizing trailer hitch dolly, according to claim 1, wherein wear plates of wear-resistant material are mounted on said cross member in spaced relationship therealong and disposed in contacting engagement with the opposite ends of said leaf spring.

* * * * *